3,405,112
ALLENE HYDROCARBON POLYMER FORMED BY 1,2-ADDITION AND METHOD OF PRODUCING THE SAME
Seinosuke Otsuka, Takarazuka-shi, and Hiroshi Mori, Taro Suminoe, Fumitake Imaizumi, and Takanao Taketomi, Yokkaichi-shi, Japan, assignors to Japan Synthetic Rubber Co., Ltd., Tokyo, Japan, a corporation of Japan
Filed Feb. 8, 1966, Ser. No. 525,992
Claims priority, application Japan, Feb. 9, 1965, 40/6,913
9 Claims. (Cl. 260—93.1)

This invention relates to a novel polymer of allene hydrocarbon in which substantially all of the polymer is formed by 1,2-addition, and to a method of producing the same.

Allene hydrocarbon such as allene and methylallene is very reactive and easily polymerizes in the presence of air to resinous materials, which are insoluble in hydrocarbon solvent. The structures of the resinous materials have not been clarified.

It is known that allene gives some oligomers by heating [Zhur. Russ. Fiz. Khim. Absch., 45, 1357 (1913), J. Am. Chem. Soc., 52, 4540 (1930), Chem. Ber., 87, 1567 (1954), J. Am. Chem. Soc., 78, 109 (1956), and Tetrahedron Letters, No. 22, 1463 (1963)].

The structures of these substances are as follows:

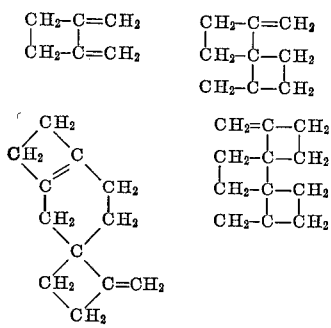

Further it is known that allene polymerizes catalytically to a high molecular weight polymer. For example, allene has been polymerized by Ziegler-type catalysts [J. Polymer Sci., AI, 655 (1963)]. But the polymer was not of regular structure and contained substantial amounts of vinyl radical, vinylidene radical and internal olefin unit, respectively.

Still further, allene was polymerized by cobalt carbonyl catalyst [J. Org. Chem., 21, 875 (1956)]. The reaction product, however, was a non-homogeneous solid. Most of the solid was brownish-yellow, and some black material was also present. The solid was not of regular structure and was insoluble in benzene.

These polymers of allene as mentioned above have not been useful in any application.

We have now discovered that a novel and unique polymer of allene hydrocarbon can be produced by proceeding in accordance with the present invention.

It is an object of this invention to provide a novel polymer of allene hydrocarbon in which substantially all of the polymer is formed by 1,2-addition.

Another object of this invention is to provide a method of polymerizing allene hydrocarbon to produce a polymer of the allene hydrocarbon in which substantially all of the polymer is formed by 1,2-addition.

Figure 1:
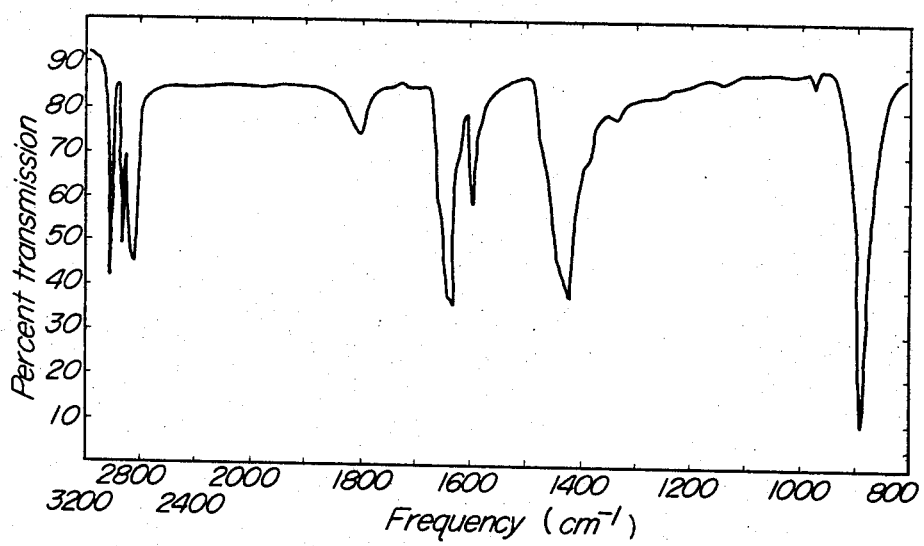
Figure 2:
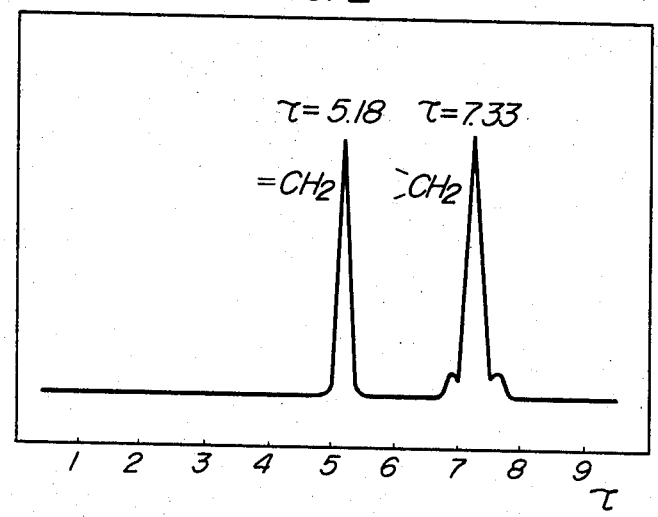

Other and further objects and advantages of this invention will become apparent to one skilled in the art upon consideration of the accompanying disclosure and drawings, in which:

FIG. 1 is the infrared absorption spectrum of the polyallene film produced by the method of this invention, and FIG. 2 is the nuclear magnetic resonance absorption spectrum of the polyallene produced by the method of this invention.

It has now been discovered that a novel and unique polymer of allene hydrocarbon of the formula $$CH_2=C=CR_2$$

wherein R is selected from the group consisting of hydrogen, phenyl radical, and alkyl radical containing from 1 to 4 carbon atoms, is obtained when the allene hydrocarbon is polymerized catalytically in the presence of a π-complex compound of nickel at a temperature from −50 to 100° C. in an inert gas atmosphere.

All monomer units of the allene hydrocarbon polymer produced by the method of this invention are formed by 1,2-addition which fact has been confirmed with the nuclear magnetic resonance absorption spectrum. Therefore, the term "substantially all" used in this specification and claims has the same meaning as "100% by measurement with the nuclear magnetic resonance absorption spectrum."

The term "1,2-addition" means that additional polymerization of allene hydrocarbon of the formula:

$$\overset{1}{C}H_2=\overset{2}{C}=\overset{3}{C}R_2$$

takes place at the 1,2 carbon atoms.

The π-complex compound of nickel of this invention is a nickel complex compound having at least one ligand capable of forming a π-complex. The ligands capable of forming a π-complex include olefins such as ethylene, 1,5-cyclooctadiene, norbornadiene, cyclooctatetraene, cyclododecatriene, tetramethylcyclobutadiene and tetraphenylcyclobutadiene; enyl ligands [refer to Chem. Revs., 62, 634 (1962)] such as π-allyl, π-methallyl, π-crotyl and π-cyclopentadienyl; vinyl compounds such as acrylonitrile, acrolein and methacrolein; isonitrile compounds such as tert.-butylisonitrile, phenylisonitrile and methylisonitrile; phosphine compounds such as triphenylphosphine and triethylphosphine; phosphite compounds such as triphenylphosphite and triethylphosphite; nitroso; and carbonyl.

It is to be understood that a π-complex compound of nickel having two or more different ligands abovementioned can also be used.

Suitable examples of these π-complex compounds of nickel are bis(1,5-cyclooctadiene) nickel, bis((π-allyl) nickel, π-allyl-nickel halide, dicyclopentadienyl nickel, bis(acrylonitrile) nickel, nickel carbonyl and tetrakis (tert.-butylisonitrile) nickel.

The allene hydrocarbon being polymerized by the method of this invention can be represented by the formula $CH_2=C=CR_2$, wherein R is selected from the group consisting of hydrogen, phenyl radical, and alkyl radical containing from 1 to 4 carbon atoms. The alkyl radicals can be either straight or branched alkyls, for example, methyl, ethyl, propyl, isopropyl, n-butyl, isobutyl and tert.-butyl. Furthermore it is to be understood that the alkyl radicals in the abovementioned formula can be the same or they can be different.

Examples of these allene hydrocarbons are allene, methylallene, ethylallene, propylallene, n-butylallene, dimethylallene, diethylallene, phenylallene and diphenylallene.

The polymerization method of this invention can be carried out at any temperature within the range of −50 to 100° C., but it is preferred to operate in the range of 0 to 40° C.

The polymerization must be carried out in an inert gas atmosphere such as nitrogen, helium and argon.

It is preferred to carry out the polymerization in the presence of hydrocarbon or ether diluent, although the polymerization can be carried out without the use of such diluent. Diluents suitable for use in the polymerization process are hydrocarbons which are inactive for the catalyst and which are liquid under the conditions of the process. Suitable diluents include aromatics such as benzene, toluene and xylene, aliphatics, such as pentane, hexane and heptane, and cycloaliphatics such as cyclohexane and methyl cyclohexane, and ethers such as ethyl-ether and tetrahydrofuran. Olefins such as ethylene, propylene, butene-1 and butene-2 can also be used as diluents.

The polymerization reaction can be carried out under autogenous pressure or any suitable pressure sufficient to maintain the reaction mixture substantially in the liquid phase. The pressure will thus depend upon the particular diluent being used and the temperature at which the polymerization is carried out.

The amount of the catalyst of this invention which is used in the polymerization of allene hydrocarbon can vary over a wide range. Preferably the amount of the catalyst is in the range of 0.2 to 10 millimoles per mole of allene hydrocarbon. If desired, however, a higher or lower level of the catalyst than the above range can also be used. For example, it is possible to decrease the catalyst level to 0.1 millimole per mole of allene hydrocarbon.

At the completion of the polymerization reaction, an antioxidant is added to the reaction mixture and then the total reaction mixture is poured into alcohol to inactivate the catalyst and precipitate the resulting polymer. As antioxidant, 2,2'-methylene-bis (4-methyl-6-tert.-butylphenol) is preferable. Thus precipitated polymer is separated, washed with alcohol and dried.

The infrared absorption spectrum of the polyallene produced in accordance with the present invention is shown in FIG. 1. The out of plane deformation of $=CH_2$, the $—CH_2—$ bending deformation, $C=C$ stretching, and $C—H$ stretching are observed at 897, 1426, 1636, and 2900–3100 cm.$^{-1}$, respectively. A very weak band at 990 cm.$^{-1}$ may be derived from the vinyl group possibly involved in trace amount.

FIG. 2 is the nuclear magnetic resonance absorption spectrum of the polyallene, which was measured in carbon tetrachloride and shows only two intense peaks (singlet) at 7.31 ($—CH_2—$) and 5.05 ($=CH_2$) with an approximately equal integral value.

Hence, the predominant structural units of the polyallene are vinylidene and methylene groups. The repeating unit is as follows:

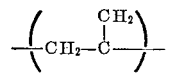

Substantiating evidence for the correctness of the structure described above is available from X-ray analysis. The oriented sample of the polyallene showed a highly crystalline X-ray fiber diagram. Results of the X-ray studies indicate that the molecular structure is a succession of nearly gauche conformations, i.e., a $2_1$ helix.

Generally, substantially all of the polymer produced by the method of this invention is formed by 1,2-addition, i.e., substantially all of the repeating units of the polymer is as follows:

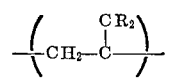

The polyallene obtained by the method of this invention is a colorless solid and highly soluble in benzene, toluene, carbon disulfide, carbon tetrachloride and chloroform, soluble in cyclohexane and diethyl ether, but slightly or hardly soluble in n-hexane, acetone and ethanol. The intrinsic viscosity of the polyallene having a number average molecular weight of $1.07 \times 10^5$ was 1.25, measured in cyclohexane at 30° C.

The polymethylallene obtained by the method of this invention is a colorless rubbery polymer.

The polydimethylallene obtained by the method of this invention is a colorless powdery polymer.

Since polyallene contains high reactive vinylidene groups, it can be converted to useful polymers having various functional groups by reacting it with various reagents. For example, it is possible to obtain polyallene having halogens, hydroxyl radicals, alkoxy radicals or ester radicals by adding hydrogen halide, water, alcohol and organic acid, respectively, to the vinylidene groups of the polyallene. It is also possible to incorporate carbonyl groups in the polyallene by oxidizing it with peracetic acid in acetic anhydride.

Polymethylallene can be used as a rubber by curing it according to conventional method.

Polydimethylallene has a high melting point and can be used as a plastics.

A more comprehensive understanding of the invention can be obtained by referring to the following illustrative examples which are not intended, however, to be unduly limitative of the invention.

Example I

To a 100 ml. ampule, 27.5 mg. (0.1 mmole) of bis (1,5-cyclooctadiene) nickel was charged, 40 ml. of 2.5 mole benzene solution of allene was charged, and then benzene was added so as to bring the total content to 50 ml. in the ampule at about 3° C. Following this charge, the ampule was sealed.

The above procedure was conducted in a nitrogen gas atmosphere. The benzene used in the above procedure was previously deoxygenated and dried.

The ampule was tumbled in a water bath at 40° C. for 24 hours. At the end of this time, 4 ml. of 10% benzene solution of 2,2'-methylene-bis-(4-methyl-6-tert.-butylphenol) as antioxidant was added to the ampule. The ampule contents were then poured into 300 ml. of methanol while stirring. Thus the precipitated polymer was separated, washed with methanol in a blender and dried in vacuo.

Colorless polymer (2.70 g.) was obtained. The intrinsic viscosity was 0.74, measured in toluene at 30° C.

The polymer thus obtained was a crystalline polymer in which substantially all of the polymer was formed by 1,2-addition and was of a gauche conformation. his was observed by infrared absorption spectrum, nuclear magnetic resonance absorption spectrum and X-ray analysis.

Example II

Allene was polymerized with the same method as in Example I except that toluene was used instead of benzene. The yield was 45.3%.

Example III

Example II was repeated except that the amount of the catalyst was decreased to 0.02 mmole and that the polymerization time was 71 hours.

A colorless crystalline polymer was obtained with a yield of 20.3%. The microstructure of the polymer was the same with that of the polymer obtained in Example I.

Example IV

Allene was polymerized by the same method as in Example I except that tetrahydrofuran was used instead of benzene. The yield was 41.0%.

Example V

Allene was polymerized by the same conditions as in Example I except that bis (acrylonitrile) nickel was used instead of bis (1,5-cyclooctadiene) nickel and that the polymerization temperature was varied.

The results are shown in Table 1.

TABLE 1

| Experiment No. | Polymerization Temp., ° C. | Yield, Percent |
|---|---|---|
| 1 | 7 | 12.3 |
| 2 | 40 | 39.5 |

The number average molecular weight of the polymer obtained in Experiment 1 was $7 \times 10^4$.

Example VI

By the same procedure as in Example I, allene was polymerized by π-allylnickel bromide catalyst at 0° C. in toluene. The catalyst level and polymerization time were varied.

The results are shown in Table 2.

TABLE 2

| Experiment No. | Catalyst Level, mmole | Polymerization Time, hour | Yield, percent |
|---|---|---|---|
| 1 | 0.02 | 22 | 7.8 |
| 2 | 0.05 | 22 | 54.0 |
| 3 | 0.1 | 17 | 76.0 |

Example VII

Allene was polymerized by the same method as in Example I except that tetrakis (tert.-butylisonitrile) nickel was used as catalyst.

A colorless polymer was obtained with a yield of 24.0%.

Example VIII

Methylallene (5.41 g.) was polymerized by various catalysts under the same polymerization conditions as in Example I.

The results are shown in Table 3.

TABLE 3

| Experiment No. | Catalyst | Yield, percent |
|---|---|---|
| 1 | Bis(1,5-cyclooctadiene) nickel | 65.9 |
| 2 | Bis(acrylonitrile) nickel | 25.3 |
| 3 | π-allylnickel bromide | 100 |
| 4 | π-allylnickel iodide | 100 |

Th polymers were colorless and rubbery. The structure of polymethylallene was formed by 1,2-addition which fact has been confirmed with the nuclear magnetic resonance absorption spectrum.

Example IX

Two runs were made in which 6.8 g. of dimethylallene was polymerized by 0.08 mmole of π-allylnickel bromide at 0° C. by the same procedure as in Example I. The polymerization times were 3 and 17 hours, and the yields were 55.4% and 91.9%, respectively.

The structure of the polydimethylallene was formed by 1,2-addition which fact has been confirmed with nuclear magnetic resonance absorption spectrum.

Example X

Dimethylallene (6.8 g.) was polymerized by 0.02 mmole of bis (1,5-cyclooctadiene) nickel at 40° C. for 2 hours by the same procedure as in Example I.

A colorless powdery polymer was obtained with a yield of 12.5%.

As will be evident to those skilled in the art, many variations and modifications can be practiced which fall within the scope of this invention.

What we claim is:

1. A polymer of allene hydrocarbon of the formula $CH_2=C=CR_2$, wherein R is selected from the group consisting of hydrogen, phenyl radical, and alkyl radical containing from 1 to 4 carbon atoms, in which substantially all of the polymer is formed by 1,2-addition.

2. A polymer of allene in which substantially all of the polymer is formed by 1,2-addition.

3. A polymer of methylallene in which substantially all of the polymer is formed by 1,2-addition.

4. A polymer of dimethylallene in which substantially all of the polymer is formed by 1,2-addition.

5. A method of polymerizing allene hydrocarbon of the formula $CH_2=C=CR_2$, wherein R is selected from the group consisting of hydrogen, phenyl radical, and alkyl radical containing from 1 to 4 carbon atoms, which comprises contacting the allene hydrocarbon with a π-complex compound of nickel at a temperature from −50 to 100° C. in an inert gas atmosphere.

6. A method according to claim 5 in which the allene hydrocarbon is selected from the group consisting of allene, methylallene and dimethylallene.

7. A method accordng to claim 5 in which the π-complex compound of nickel is selected from the group consisting of bis (1,5-cyclooctadiene) nickel, bis (acrylonitrile) nickel, π-allylnickel halide and tetrakis (tert.-butylisonitrile) nickel.

8. A method according to claim 5 in which the polymerization is conducted in the presence of a diluent.

9. A method according to claim 5 in which the amount of the π-complex compound of nickel is in the range of 0.2 to 10 millimoles per mole of the allene hydrocarbon.

References Cited

UNITED STATES PATENTS 3,247,175  4/1966  Volkenburgh et al. __ 260—94.3

OTHER REFERENCES

Journal of Polymer Science; Part A, vol. 1, pp. 655–70 (1963).

JOSEPH L. SCHOFER, *Primary Examiner.*

L. EDELMAN, *Assistant Examiner.*